United States Patent
Katoh et al.

(10) Patent No.: US 11,370,670 B2
(45) Date of Patent: Jun. 28, 2022

(54) LITHIUM MIXED METAL SULFIDE WITH HIGH IONIC CONDUCTIVITY

(71) Applicant: TOYOTA MOTOR EUROPE, Brussels (BE)

(72) Inventors: Yuki Katoh, Brussels (BE); Geoffroy Hautier, Brussels (BE); Anna Miglio, Louvain-la-Neuve (BE)

(73) Assignee: TOYOTA MOTOR EUROPE, Brussels (BE)

( * ) Notice: Subject to any disclaimer, the term of this patent is extended or adjusted under 35 U.S.C. 154(b) by 360 days.

(21) Appl. No.: 16/628,631

(22) PCT Filed: Jul. 5, 2017

(86) PCT No.: PCT/EP2017/066804
§ 371 (c)(1),
(2) Date: Jan. 3, 2020

(87) PCT Pub. No.: WO2019/007501
PCT Pub. Date: Jan. 10, 2019

(65) Prior Publication Data
US 2021/0155494 A1    May 27, 2021

(51) Int. Cl.
*C01G 1/12* (2006.01)
*C01G 17/00* (2006.01)
(Continued)

(52) U.S. Cl.
CPC ............. *C01G 1/12* (2013.01); *C01G 17/006* (2013.01); *C01G 21/006* (2013.01);
(Continued)

(58) Field of Classification Search
None
See application file for complete search history.

(56) References Cited

U.S. PATENT DOCUMENTS

| 8,697,292 B2* | 4/2014 | Kanno | H01B 1/10 |
| | | | 429/321 |
| 2015/0017548 A1* | 1/2015 | Kato | C01B 25/14 |
| | | | 423/303 |

FOREIGN PATENT DOCUMENTS

| EP | 2555307 A1 | 2/2013 |
| EP | 3067979 A2 | 9/2016 |

(Continued)

OTHER PUBLICATIONS

Atsushi Aoki et al., JP Patent Application No. 2020-520711, Japanese Office Action dated Aug. 3, 2021 (with English translation).
(Continued)

*Primary Examiner* — Eli S Mekhlin
(74) *Attorney, Agent, or Firm* — Dickinson Wright PLLC

(57) ABSTRACT

The present invention relates to a compound represented by the general formula $Li_{2+2x}M_{1-x}ZS_4$, wherein $0.3 \leq x \leq 0.9$; wherein M is one or more elements selected from the group consisting of Pb, Mg, Ca, Ge and Sn; and wherein Z is one or more elements selected from the group consisting of Ge, Si, Sn and Al.

The present invention also relates to a method for preparing the material of the present invention, comprising the steps of:
(a) providing a mixture of lithium sulfide $Li_2S$, sulfides MS and $ZS_2$, in a stoichiometric ratio ensuring $Li_{2+2x}M_{1-x}ZS_4$ to be obtained, wherein M, Z and x are as defined above;
(b) pelletizing the mixture prepared in step (a);
(c) heating at a maximum plateau temperature.

In still another aspect, the present invention relates to a use of the compound of the present invention as a solid electrolyte, in particular in an all solid-state lithium battery.

19 Claims, 3 Drawing Sheets

(a)

(b)

(51) Int. Cl.
  *C01G 21/00* (2006.01)
  *H01M 10/0525* (2010.01)
  *H01M 10/0562* (2010.01)

(52) U.S. Cl.
  CPC ... *H01M 10/0525* (2013.01); *H01M 10/0562* (2013.01); *C01P 2002/72* (2013.01); *C01P 2002/74* (2013.01); *H01M 2300/0068* (2013.01)

(56) References Cited

FOREIGN PATENT DOCUMENTS

| | | |
|---|---|---|
| JP | H06-279050 A | 10/1994 |
| JP | 2010199033 A | 9/2010 |
| JP | 2013-33659 A | 2/2013 |
| WO | 2013/118723 A1 | 8/2013 |

OTHER PUBLICATIONS

Aitken et al., "$Li_2PbGeS_4$ and $Li_2EuGeS_4$: Polar Chalcopyrites with a Severe Tetragonal Compression," Chem. Mater. 2001, 13, 4714-4721.

Kanno et al., "Lithium Ionic Conductor Thio-LISICON," Journal of the Electrochemical Society, 148 (7) A742-A746 (2001).

* cited by examiner

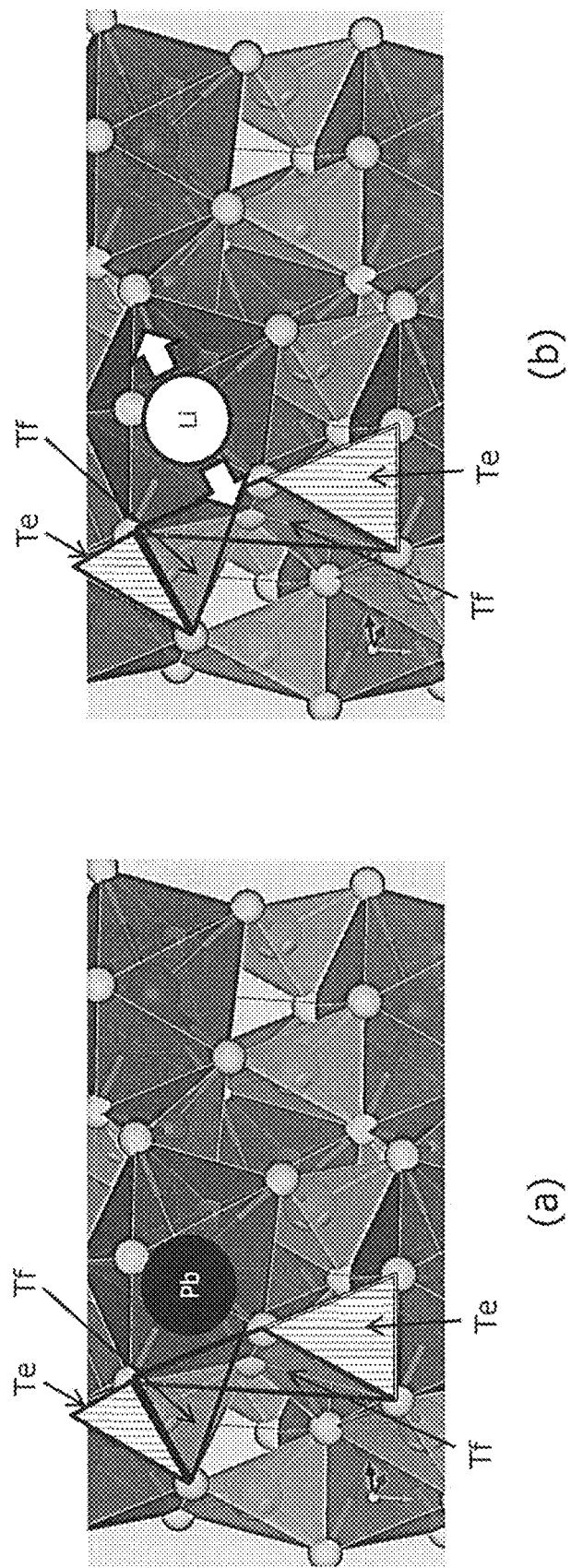
Fig. 1 Structure of (a) $Li_2PbGeS_4$ and (b) $Li_{2+2x}Pb_{1-x}GeS_4$

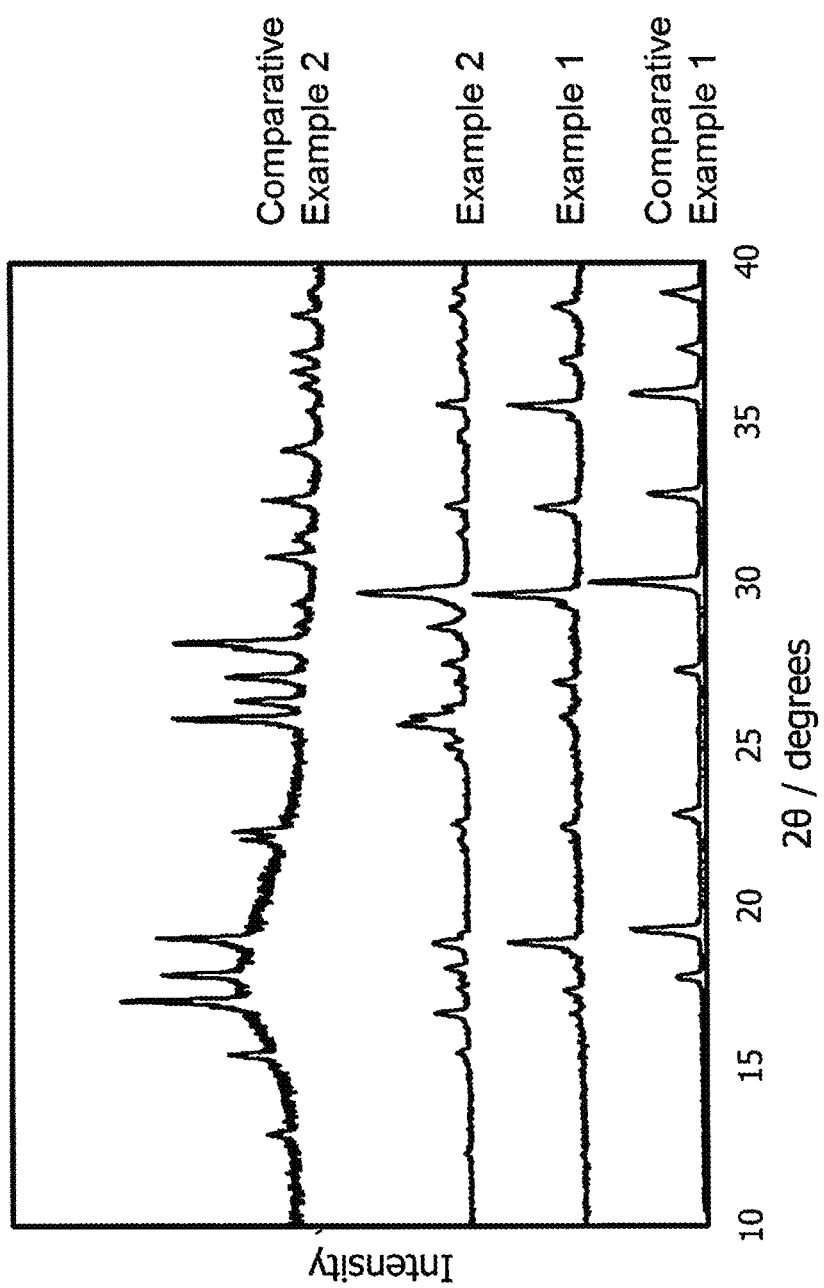
Fig. 2 XRD patterns for the materials of Example and Comparative Example

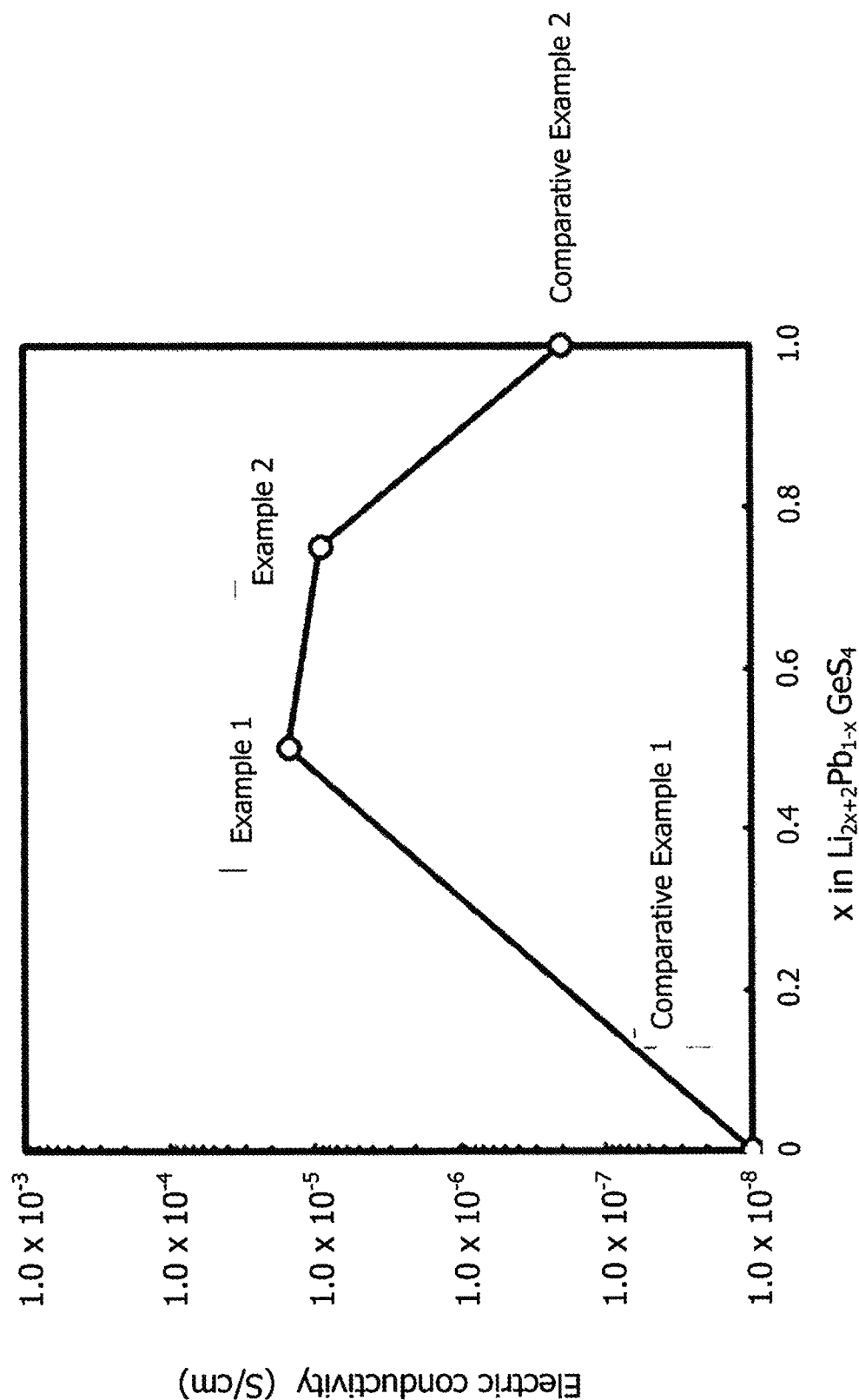
Fig. 3 Ionic conductivity of the examples.

LITHIUM MIXED METAL SULFIDE WITH HIGH IONIC CONDUCTIVITY

RELATED APPLICATION

This application is a National Stage entry of PCT/EP2017/066804, filed Jul. 5, 2017, the entire disclosure of which is incorporated herein by reference.

FIELD OF INVENTION

The present invention relates to a new lithium mixed metal sulfide with high ionic conductivity.

BACKGROUND ART

The all-solid-state battery system offers the possibility of high energy density of the battery pack. In order to realize such systems, a solid electrolyte which exhibits high ionic conductivity is demanded. Aitken et al., Chem. Mater. 2001, 13, 4714-4721 discloses $Li_2S$—$GeS_2$—$P_2S_5$, having an improved ionic conductivity. Kanno et al., Journal of The Electrochemical Society, 148 (7) A742-A746 (2001) discloses $Li_2PbGeS_4$, and indicates that it can possibly be used as semiconductor material. However, Kanno does not disclose its ionic conductivity.

Therefore there is a need for a solid electrolyte which exhibits high ionic conductivity.

Non-patent literature 1: Chem. Mater. 2001, 13, 4714-4721
Non-patent literature 2: Journal of The Electrochemical Society, 148 (7) A742-A746 (2001)

SUMMARY OF THE INVENTION

In one aspect, the present invention relates to a compound represented by the general formula $Li_{2+2x}M_{1-x}ZS_4$, wherein $0.3 \leq x \leq 0.9$;
wherein M is one or more elements selected from the group consisting of Pb, Mg, Ca, Ge and Sn; and
wherein Z is one or more elements selected from the group consisting of Ge, Si, Sn and Al.

In another aspect, the present invention relates to a method for preparing the material of the present invention, comprising the steps of:
(a) providing a mixture of lithium sulfide $Li_2S$, sulfides $MS$ and $ZS_2$, in a stoichiometric ratio ensuring $Li_{2+2x}M_{1-x}ZS_4$ is obtained, wherein M, Z and x are as defined above;
(b) pelletizing the mixture prepared in step (a);
(c) heating at a maximum plateau temperature.

In this aspect, the present invention also relates to the compound obtainable by the above method.

In still another aspect, the present invention relates to a use of the compound of the present invention as a solid electrolyte, in particular in an all solid-state lithium battery.

In still another aspect, the present invention relates to an all solid-state lithium battery comprising:
a positive electrode active material layer;
a solid electrolyte layer; and
a negative electrode active material layer;
wherein the solid electrolyte comprises the compound represented by the general formula $Li_{2+2x}M_{1-x}ZS_4$ according to the present invention.

BRIEF DESCRIPTION OF THE FIGURES

FIGS. 1 (a) and (b) schematically present the structure of $Li_2PbGeS_4$ and $Li_{2+2x}Pb_{1-x}GeS_4$, respectively.

FIG. 2 presents X-ray diffraction patterns of materials obtained in Examples 1 and 2, and Comparative Examples 1 and 2.

FIG. 3 presents the relationship between the ionic conductivity and the composition.

DETAILED DESCRIPTION OF THE INVENTION

The present inventors' intensive research for solving the above mentioned technical problem has revealed surprisingly that a compound represented by the general formula $Li_{2+2x}M_{1-x}ZS_4$:
wherein $0.3 \leq x \leq 0.9$, preferably $0.4 \leq x \leq 0.8$, more preferably $0.45 \leq x \leq 0.75$, and most preferably $x=0.5$;
wherein M is one or more elements selected from the group consisting of Pb, Mg, Ca and Sn, preferably from the group consisting of Pb, Mg and Ca, more preferably from the group consisting of Pb and Mg and most preferably Pb; and
wherein Z is one or more elements selected from the group consisting of Ge, Si, Sn and Al, preferably from the group consisting of Ge, Si and Sn, more preferably from the group consisting of Ge and Si, and most preferably Ge; has a high ionic conductivity.

In one embodiment, M is only one element.
In one embodiment, Z is only one element.
In one embodiment M and Z are only one element respectively.

The subject-matter of the present invention relates to all the possible combinations of M which is one or more elements selected from the group consisting of Pb, Mg, Ca and Sn and Z which is one or more elements selected from the group consisting of Ge, Si, Sn and Al, with all possible combinations of lower limit value and upper limit value of x.

When the x value is in the above-mentioned ranges and particularly within the preferred ranges, the material may show high ionic conductivity. For example, $Li_{2+2x}Pb_{1-x}GeS_4$ (i.e. M=Pb and Z=Ge) wherein $0.45 \leq x \leq 0.75$ shows an ionic conductivity 1000 times higher than $Li_2PbGeS_4$.

One possible explanation for the high ionic conductivity of the compound of formula $Li_{2+2x}M_{1-x}ZS_4$ compared with that of $Li_2M_1ZS_4$ might be as follows, for example for the case wherein M=Pb and Z=Ge.

$Li_2PbGeS_4$, a mixed sulphide of Li, Pb and Ge, has low ionic conductivity. Without wishing to be bound by any particular theory, this might be due to its atomic arrangement as shown in FIG. 1(a), wherein Tf site means "face-sharing with $PbS_8$ site" and Te site means "edge-sharing with $PbS_8$ site".

Here, on one hand, Tf site in Li-moving site (i.e. Li migration path) is too close to the Pb atom, which leads to a strong Li—Pb repulsion force and prevents Li from moving in this crystal structure. On the other hand, the vibration of Pb atom located at a $PbS_8$ polyhedral site is small. Therefore, Li can not move on the pathway, resulting in a low ionic conductivity.

In $Li_{2+2x}Pb_{1-x}GeS_4$, as shown in FIG. 1(b), the Li atom is located at a $PbS_8$ polyhedral site instead of Pb and the vibration of Li atom is greater than that of a Pb atom. Therefore, the distance between the Tf site and the Li atom oscillates due to the vibration of Li, at a distance favourable for Li atom migration, resulting in a high ionic conductivity.

Without wishing to be bound by any specific theory, the above explanation is considered to be applicable to all the possible combinations of M and Z according to the present invention. This is because the mass of Li is much smaller than M and Z.

Without wishing to be bound by any particular theory, the ionic conductivity was enhanced by increasing the value of x up to x=0.45. This is thought to be because the distance between Li migration path and M atom becomes large enough to let Li atoms migrate.

Without wishing to be bound by theory, the conductivity decreased above x=0.75. This is thought to be because the distance between Li migration path and M atom is too large and secondary phase $Li_4GeS_4$, having low ionic conductive material, appears.

Compounds according to the invention may be observed to have phase A, and/or a β value of 0.6 or more.

Phase A and phase B represent the crystal structure of $Li_2PbGeS_4$ and $Li_4GeS_4$, respectively.

Phase A for the compound $Li_{2x+x}M_{1-x}ZS_4$ of the present invention, for any possible combination of M, Z and x according to the present invention, may have peaks in positions of 2θ=17.75° (±1.0°), 19.26° (±1.0°), 22.84° (±1.0°), 27.38° (±1.0°), 30.06° (±1.0°), 32.82° (±1.0°), 35.94° (±1.0°), 37.34° (±1.0°), 39.06° (±1.0°) in an X-ray diffraction measurement using a CuKα line.

Phase B for the compound $Li_{2x+x}M_{1-x}ZS_4$ of the present invention, for any possible combination of M, Z and x according to the present invention, may have peaks in positions of 2θ=15.40° (±1.0°), 16.64° (±1.0°), 25.62° (±1.0°), 25.92° (±1.0°), 27.62° (±1.0°), 28.64° (±1.0°) in an X-ray diffraction measurement using a CuKα line.

The value of β is calculated for any combination of M, Z and x according to the present invention, by the following formula, wherein I is the intensity of XRD patterns at the position indicated in the parenthesis:

$$\beta = \frac{I(2\theta = 30.06°)}{I(2\theta = 30.06°) + I(2\theta = 25.62°)}$$

In one preferred embodiment, M=Pb and Z=Ge.

In another preferred embodiment, 0.25≤x≤0.75, M=Mg and Z=Si.

<Method of Synthesis>

The compound represented by the general formula $Li_{2+2x}M_{1-x}ZS_4$ according to the present invention can be obtained, for example, by a method of synthesis comprising the steps of:

(a) providing a mixture of lithium sulfide $Li_2S$, sulfides MS and $ZS_2$, in a stoichiometric ratio ensuring $Li_{2+2x}M_{1-x}ZS_4$ is obtained;

(b) pelletizing the mixture prepared in step (a);

(c) heating treatment step at a maximum plateau temperature.

Here, "in a stoichiometric ratio ensuring $Li_{2+2x}M_{1-x}ZS_4$ to be obtained" refers to a molar ratio of $Li_2S:MS:ZS_2=(2+2x):(1+x):2$.

Here, "maximum plateau temperature" refers to the maximum temperature maintained in a heating vessel as commonly used in solid state chemistry, the temperature vs. time profile typically including a gradual ascent phase with a controlled rate of increase of temperature starting from room temperature, a chosen reaction temperature maintained effectively constant over a period of time (the "maximum plateau temperature"), and then a descent phase wherein the temperature is brought back down to room temperature.

The use of the above method allows one to manufacture the product of the present invention.

In terms of starting material mole ratios, the above preferred method of synthesis is appropriately carried out with as close as possible to a stoichiometric ratio thereof in view of the final product $Li_{2+2x}M_{1-x}ZS_4$ to be produced. Thus, the lithium sulphide $Li_2S$, sulphide MS and sulphide $ZS_2$ starting materials are generally used in a $Li_2S:MS:ZS_2$ mole ratio of (2+2x):(1-x):1.

In terms of pelletizing step b), step b) is carried out under 10 Pa or more and 50 Pa or less, preferable under 20 Pa or more and 40 Pa or less and, most preferably under 30 Pa.

In terms of the temperature of heating step c), step c) is carried out at 400° C. or more and 800° C. or less, and preferably at 500° C. or more and 700° C. or less, and most preferably at 600° C.

In the above preferred method of synthesis, each of the method steps (a), (b) and (c) is advantageously carried out under an inert gas, for example, nitrogen, helium or argon, preferably argon.

<All Solid-State Lithium Battery>

In a further aspect, the present disclosure relates to an all-solid-state lithium battery comprising the following elements:

a positive electrode active material layer;
a solid electrolyte layer;
a negative electrode active material layer, wherein the solid electrolyte layer contains $Li_{2+2x}M_{1-x}ZS_4$ material according to the present invention, and is positioned between the positive electrode active material layer and negative electrode active material layer.

In such an all-solid-state lithium battery, using as solid electrolyte, the $Li_{2+2x}M_{1-x}ZS_4$ materials according to the present invention, concerning the form of the solid electrolyte materials, examples include a particle shape, such as the shape of a true ball and the shape of an elliptical ball, or a thin film form, for example. When solid electrolyte materials have a particle shape, as for the mean particle diameter, it is preferable that their size is within the range of 50 nm to micrometers, more preferably within the range of 100 nm to 5 micrometers.

Although it is preferable to have only one or more solid electrolyte materials as mentioned above in a solid electrolyte layer, this layer may also contain a binding agent if needed. As a binding agent used for a solid electrolyte layer, this may be of the same type as mentioned hereunder for the positive active material layer.

As regards the thickness of a solid electrolyte layer, although this may change with the kind of solid electrolyte materials, and the overall composition of an all-solid battery, generally it is preferable that this thickness is within the range of 0.1 micrometer to 1000 micrometers, more preferably within the range of 0.1 micrometer to 300 micrometers.

Concerning the positive active material (cathode active material) to be used in the positive electrode (cathode) active material layer, this is not especially limited if the average operating potential becomes more than 4 V (vs. Li/Li$^+$). As an average operating potential of positive active material, this is appropriately more than 4 V (vs. Li/Li$^+$), and it is preferable that it is within the limits of 4.0 V to 6.0 V, still more preferably within the limits of 4.5 V to 5.5 V. The average operating potential can be evaluated using cyclic voltammetry, for example. In particular, when cyclic voltammetry is measured at a small electric potential speed like 0.1 mV/sec, it can be considered that the average value of the voltage which gives the peak current on the side of oxidation, and the voltage which gives the peak current on the side of reduction is the average operating potential.

As a positive active material, especially if the average operating potential is made with more than 4 V (vs. Li/Li$^+$), there is no specific limitation, but it is preferable that the material is an oxide positive active material, which can have a high energy density.

A compound which has the spinel type structure denoted by general formula LiM$_2$O$_4$ (M is at least one kind of transition metal element), as an example of positive active material, can be mentioned as an example. As regards M of the above-mentioned general formula LiM$_2$O$_4$, especially if it is a transition metal element, it will not be limited, but it is preferable that it is at least one kind chosen from the group which consists of Ni, Mn, Cr, Co, V, and Ti, for example, and it is more preferable that it is at least one kind chosen from the group which consists of Ni, Mn, and Cr especially. Specifically, LiCr$_{0.05}$Ni$_{0.50}$Mn$_{1.45}$O$_4$, LiCrMnO$_4$, LiNi$_{0.5}$Mn$_{1.5}$O$_4$, etc. can be mentioned. The compound which has the olivine type structure denoted by general formula LiMPO$_4$ (M is at least one kind of transition metal element) as other examples of positive active material can be mentioned. M in the above-mentioned general formula will not be limited especially if it is a transition metal element, but it is preferable that it is at least one kind chosen from Mn, Co, Ni, and the group that consists of V, for example, and it is more preferable that it is at least one kind chosen from the group which consists of Mn, Co, and Ni especially. Specifically, LiMnPO$_4$, LiCoPO$_4$, LiNiPCO$_4$, etc. can be mentioned. The compound which has the layer structure denoted by general formula LiMO$_2$ (M is at least 1 type of a transition metal element) as other examples of positive active material can be mentioned. Specifically, LiCoO$_2$, LiNi$_{0.5}$Mn$_{0.5}$O$_2$ and LiNi$_{0.33}$Co$_{0.33}$Mn$_{0.33}$O$_2$ etc. can be mentioned. As examples other than the positive active material mentioned above, a Li$_2$MnO$_3$—LiNi$_{1/3}$Co$_{1/3}$Mn$_{1/3}$O$_2$ solid solution, a Li$_2$MnO$_3$—LiNi$_{0.5}$Mn$_{1.5}$O$_2$ solid solution, a Li$_2$MnO$_3$—LiFeO$_2$ solid solution, etc. can be mentioned.

As regards the form of the positive active material, a particle shape, such as the shape of a true ball and the shape of an elliptical ball, thin film form, etc. can be mentioned, as an example. As for the mean particle diameter, when the positive active material has a particle shape, it is preferable that it is within the size range of 0.1 micrometer to 50 micrometers, for example. As for the content of the positive active material in a positive active material layer, it is preferable that it is in the range of 10% by weight to 99% by weight, for example, more preferably from 20% by weight to 90% by weight.

Concerning the positive active material layer, in addition to the positive active material mentioned above, if needed, the positive active material layer in may contain other materials, for example, solid electrolyte materials etc. As for the content of the solid electrolyte materials in a positive active material layer, it is preferable that this content is 1% by weight to 90% by weight, more preferably 10% by weight to 80% by weight.

Furthermore, a positive active material layer may contain an electrically conductive agent from a viewpoint of improving the conductivity of a positive active material layer, other than the solid electrolyte materials mentioned above. As electrically conductive material, acetylene black, Ketjen-black, a carbon fiber, etc. can be mentioned, for example. A positive active material may also contain a binding agent. As such a binding material (binding agent), fluorine-based binding materials, such as polyvinylidene fluoride (PVDF) and polytetrafluoroethylene (PTFE), etc. can be mentioned, for example.

Although the thickness of a positive active material layer may change according to the kind of all-solid-state battery made, it is generally preferable that it is within the range of 0.1 micrometer to 1000 micrometers.

As regards the negative electrode active material layer, this layer at least contains one or more negative electrode active material(s), and may additionally contain at least one or more of solid electrolyte materials and electrically conductive agents if needed. For all-solid-state lithium batteries, the negative electrode active material is not limited provided that occlusion and discharge of the Li ion, which is a conduction ion, are possible. As a negative electrode active material, a carbon active material, a metal active material, etc. can be mentioned, for example. As a carbon active material, black lead, meso carbon micro beads (MCMB), highly ordered/oriented pyrolytic graphite (HOPG), hard carbon, soft carbon, etc. can be mentioned as examples. On the other hand, as a metal active material, charges of an alloy, such as Li alloy and Sn—Co—C, In, Al, Si, Sn, etc. can be mentioned as examples. Oxide stock materials, such as Li$_4$Ti$_5$O$_{12}$, can be mentioned as examples of other negative electrode active materials.

Concerning solid electrolyte materials used for the negative electrode active material layer, and an electrically conductive agent, these may be the same as that for the solid electrolyte layer and positive active material layer mentioned above.

The thickness of the negative electrode active material layer will generally be appropriately within the range of 0.1 micrometer to 1000 micrometers.

An all-solid-state battery of the present disclosure has at least the positive active material layer, solid electrolyte layer, and negative electrode active material layer which were mentioned above. It further usually has a positive pole collector which collects a positive active material layer, and a negative pole collector which performs current collection of a negative electrode active material layer. As a material of a positive pole collector, for example, SUS (stainless steel), aluminum, nickel, iron, titanium, carbon, etc. can be mentioned, and SUS is especially preferable. On the other hand as a material of a negative pole collector, SUS, copper, nickel, carbon, etc. can be mentioned, for example, and SUS is especially preferable. Concerning the thickness, form, etc. of a positive pole collector and a negative pole collector, the person skilled in the art may choose suitably according to the use of the all-solid-state battery, etc. The cell case used for a common all-solid-state battery can be used, for example, the cell case made from SUS, etc. can be mentioned. The all-solid-state battery may form a power generation element in the inside of an insulating ring.

The all-solid-state battery of the present disclosure can be considered as a chargeable and dischargeable all-solid-state battery in a room temperature environment. Although it may be a primary battery and may be a rechargeable battery, it is especially preferable that it is a rechargeable battery. Concerning the form of the all-solid-state battery, a coin type, a laminated type, cylindrical, a square shape, etc. can be mentioned, as examples.

As regards the manufacturing method of the all-solid-state battery, this is not particularly limited, and common manufacturing methods of all-solid-state batteries can be used.

For example, when an all-solid-state battery is in the thin film form, a positive active material layer can be formed on a substrate, and the method of forming a solid electrolyte layer and a negative electrode active material layer in order, and laminating them thereafter etc., may be used.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXAMPLES

The following section illustrates experimentally the practice of the present invention, but the scope of the invention is not to be considered to be limited to the specific examples that follow.

Example 1: $Li_3Pb_0.5GeS_4$ (M=Pb, Z=Ge, x=0.5)

Synthesis of Solid Electrolytes
Mixture Step
The solid electrolyte $Li_{2+2x}M_{1-x}GeS_4$ was synthesized using starting materials $Li_2S$ (Sigma), PbS (Sigma), $GeS_2$ (Kojundo Chemical Lab). They were mixed at the weight ratio listed in Table 1 below.
Sintering Step Under Sulfur Atmosphere
The precursor was pelletized and sealed into the glass tube at the pressure of 30 Pa and then heated at 600° C. for 8 h.
Measurement of Li Ion Conductance
Li ion conductance at a temperature of 25° C. was measured using the sulfide solid electrolyte material obtained.
1) First, 100 mg of the sulfide solid electrolyte material was added to a cylinder made of alumina and pressed at 4 ton/cm² to form a solid electrolyte layer.
2) The pellet was sandwiched by SUS current collector for measuring impedance spectroscopy.
3) An impedance gain-phase analyzer manufactured by Biologic (VMP3) was used for the measurement as FRA (Frequency Response Analyzer). The measurement was started from a high-frequency range on the conditions of an alternating voltage of 5 mV, a frequency range of 1 Hz to 1 MHz.

The ionic conductivity of Example 1 was $1.5 \times 10^{-5}$ S/cm.
X-Ray Diffraction Measurement
X-ray diffraction measurement (using a CuKα line) was performed by using the sulfide solid electrolyte materials obtained in the Examples and in the Comparative Example. The results are shown in FIG. 1.

For samples prepared according to the Example 1, the peaks of the type observed for Phase A were detected, and the value of β was calculated to be 0.8.

Example 2: $Li_{3.5}Pb_{0.25}GeS_4$ (M=Pb, Z=Ge, x=0.75)

Only the x value was different from Example 1—here, the x value was 0.75. The ionic conductivity of the material produced by Example 2 was $0.9 \times 10^{-5}$ S/cm. For samples prepared according to the Example 2, the peaks of the type observed for Phase A were detected, and the value of β was calculated to be 0.6.

Comparative Example 1: $Li_2Pb_1GeS_4$ (M=Pb, Z=Ge, x=0)

Only the x value was different from Example 1—here, the x value was 0. The ionic conductivity of the material produced by Comparative Example 1 was $0.001 \times 10^{-5}$ S/cm. For samples prepared according to the Comparative Example 1, the peaks of the type observed for Phase A were detected, and the value of β was calculated to be 1.0.

Comparative Example 2: $Li_4GeS_4$ (M=Pb, Z=Ge, x=1)

Only the x value was different from Example 1—here, the x value was 1. The ionic conductivity of the material produced by Comparative Example was $0.002 \times 10^{-5}$ S/cm. For samples prepared according to the Comparative Example 1, the peaks of the type observed for Phase A were not detected, and the value of β was calculated to be 0.
Composition Optimization
From the results of Examples and Comparative Examples presented in FIG. 2, it can be noted that it is possible to obtain a high ionic conductivity of $Li_{2+2x}M_{1-x}ZS_4$ in the range of 0.3≤x≤0.9, preferably 0.4≤x≤0.8, more preferably 0.45≤x≤0.75 and most preferably x=0.5.

As shown by Example 1 and Comparative Example 1, the ionic conductivity was increased by increasing the value of x up to x=0.45. This is thought to be probably because the distance between Li migration path and M atom becomes larger.

As shown by Example 2 and Comparative Example 2, the conductivity was decreased above x=0.75. This is thought to be probably because the distance between Li migration path and M atom is too large and secondary phase $Li_4GeS_4$, having low ionic conductive material, appears.

TABLE 1

| | weight of starting materials (g) | | | |
|---|---|---|---|---|
| | Example 1 | Example 2 | Comparative Example 1 | Comparative Example 2 |
| x | 0.5 | 0.75 | 0 | 1 |
| $Li_2S$ | 0.21186903 | 0.29030483 | 0.10889399 | 0.40189312 |
| PbS | 0.3677196 | 0.21593685 | 0.56698877 | 0 |
| $GeS_2$ | 0.4204114 | 0.4937583 | 0.3241172 | 0.5981069 |

The invention claimed is:

1. A compound represented by the general formula $Li_{2+2x}M_{1-x}ZS_4$, wherein 0.3≤x≤0.9;
   wherein M is one or more elements selected from the group consisting of Pb, Mg, Ca, Ge and Sn; and
   wherein Z is one or more elements selected from the group consisting of Ge, Si, Sn and Al.
2. The compound according to claim 1, wherein 0.4≤x≤0.8.
3. The compound according to claim 1, wherein 0.45≤x≤0.75.
4. The compound according to claim 1, wherein x=0.5.
5. The compound according to claim 1, wherein M is one or more elements selected from the group consisting of Pb, Mg and Ca.

6. The compound according to claim 5, wherein M is one or more elements selected from the group consisting of Pb and Mg.

7. The compound according to claim 6, wherein M is Pb.

8. The compound according to claim 1, wherein Z is one or more elements selected from the group consisting of Ge, Si and Sn.

9. The compound according to claim 8, wherein Z is one or more elements selected from the group consisting of Ge and Si.

10. The compound according to claim 9, wherein Z is Ge.

11. The compound according to claim 1, wherein M=Pb and Z=Ge.

12. The compound according to claim 1, wherein $0.25 \leq x \leq 0.75$, M=Mg and Z=Si.

13. The compound according to claim 1, having peaks in positions of $2\theta = 17.75°$ (±1.0°), 19.26° (±1.0°), 22.84° (±1.0°), 27.38° (±1.0°), 30.06° (±1.0°), 32.82° (±1.0°), 35.94° (±1.0°), 37.34° (±1.0°), 39.06° (±1.0°) in an X-ray diffraction measurement using a CuKα line.

14. The compound according to claim 1, having a value of β of 0.6 or more, wherein β is calculated by the following formula, I being the intensity of XRD patterns at the position indicated in the parenthesis:

$$\beta = \frac{I(2\theta = 30.06°)}{I(2\theta = 30.06°) + I(2\theta = 25.62°)}.$$

15. A method for preparing the compound according to claim 1, comprising the steps of:
(a) providing a mixture of lithium sulfide $Li_2S$, sulfides MS and $ZS_2$, wherein a mole ratio of $Li_2S:MS:ZS_2$ is $(2+2x):(1-x):1$, wherein M, Z and x are as defined in claim 1;
(b) pelletizing the mixture prepared in step (a);
(c) heating at a maximum plateau temperature.

16. The method according to claim 15, wherein step b) is carried out under 10 Pa or more and 50 Pa or less.

17. The method according to claim 15, wherein step c) is carried out at 400° C. or more and 800° C. or less.

18. A solid electrolyte comprising the compound according to claim 1.

19. A solid-state lithium battery comprising:
a positive electrode active material layer;
a solid electrolyte layer; and
a negative electrode active material layer;
wherein the solid electrolyte comprises the compound represented by the general formula $Li_{2+2x}M_{1-x}ZS_4$ according to claim 1.

* * * * *